United States Patent
Lazarus et al.

(10) Patent No.: US 9,948,182 B2
(45) Date of Patent: Apr. 17, 2018

(54) LC PULSE FORMING NETWORK SUBSTITUTION FOR RAYLEIGH NETWORKS IN PULSED POWER APPLICATIONS

(71) Applicant: U.S. Army Research Laboratory ATTN: RDRL-LOC-I, Adelphi, MD (US)

(72) Inventors: Nathan S. Lazarus, Bethesda, MD (US); Sarah S. Bedair, Bethesda, MD (US)

(73) Assignee: The United Sates of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/856,846

(22) Filed: Sep. 17, 2015

(65) Prior Publication Data
US 2017/0085175 A1    Mar. 23, 2017

(51) Int. Cl.
*H02M 3/158* (2006.01)

(52) U.S. Cl.
CPC .................... *H02M 3/158* (2013.01)

(58) Field of Classification Search
CPC ........................ H02M 3/156–3/1588
See application file for complete search history.

(56) References Cited

U.S. PATENT DOCUMENTS

| | | | | |
|---|---|---|---|---|
| 3,750,168 A * | 7/1973 | Schrader | ............ | G01S 13/9303 342/30 |
| 3,808,511 A * | 4/1974 | Schwarz | ............... | H02M 3/142 363/135 |
| 4,677,539 A * | 6/1987 | Erickson | ............ | H02M 7/5387 363/132 |
| 4,888,556 A * | 12/1989 | Buttram | ................... | H05H 9/00 315/505 |
| 4,970,415 A * | 11/1990 | Fitzpatrick | ............. | G05F 3/245 323/313 |
| 2007/0272557 A1 * | 11/2007 | Matthews | ............... | C25B 15/02 205/46 |
| 2012/0146599 A1 * | 6/2012 | Oyama | ............... | H02M 3/1588 323/271 |

OTHER PUBLICATIONS

Okmura et al, "A Method for Computing Electrical Transients of Transmission Lines by Numerical Laplace Transform". Electronics and Communications in Japan, Part 1, vol. 69, No. 2 1986.*
H. Chen, V. Siliconix, "MOSFET pair makes simple SPDT switch". EDN Network Design Ideas. Dec. 9, 1999. pp. 168-169.*

* cited by examiner

*Primary Examiner* — Gary L Laxton
*Assistant Examiner* — Peter Novak
(74) *Attorney, Agent, or Firm* — Alan I. Kalb

(57) ABSTRACT

A DC-DC power converter having a power source, a load, and a transmission line terminated at one end. A first switch is electrically connected between the power source and a second end of the transmission line and movable between an open and a closed position. A second switch is electrically connected between the second end of the transmission line and the load and is movable between an open and a closed position. A switch control circuit switches the first and second switches between their respective open and closed positions. A pulse forming network forms the transmission line to store the charge in the transmission line.

2 Claims, 2 Drawing Sheets

LC PULSE FORMING NETWORK SUBSTITUTION FOR RAYLEIGH NETWORKS IN PULSED POWER APPLICATIONS

GOVERNMENT INTEREST

The invention described herein may be manufactured, used, and licensed by or for the United States Government.

BACKGROUND OF THE INVENTION

I. Field of the Invention

The present invention relates generally to DC-DC power converters and, more particularly, to such a converter which utilizes a transmission line as the energy storage device.

II. Description of Related Art

There are many previously known DC-DC power converters which utilize an energy storage device coupled with a switch to boost the voltage output to a load. Such power converters are also known as boost converters. Although different devices may be employed to store the charge necessary to boost the output voltage to the load, many of these previously known converters utilize an inductor for storing the charge to boost the voltage output.

There are, however, previously known power converters which utilize a transmission line as the charge storing device used to boost the output voltage. Unlike an inductor where all the energy storage is lumped into a single element, energy in a transmission line is stored as waves which travel between the ends of the transmission line. The distributed nature of this type of storage means is that the same transmission line can be used to simultaneously store the charge from two or more separate power converters and then use switch timing to multiplex these signals.

This same property also means that the fraction of the line inductance devoted to each converter can be changed as the energy demands shift simply by changing the switch timing.

In a normal inductor based circuit, the necessary inductance will be set by the maximum energy storage that will be needed by the power converter. During the periods when the converter is not operated at its peak capacity, the excess inductance is not used. However, with a transmission line converter, the inductance can simply be redistributed to another power converter, thus lowering the overall total needed inductance for the power converters, as well as lowering the volume, weight, and cost of the converters.

At switching frequencies up to tens of megahertz where low power resistance power switches are currently available, the necessary transmission line length is very long, i.e. on the order of inches to meters. In order to make a compact transmission line converter able to operate at these frequencies, previously known converters have utilized a circuit known as a Rayleigh network as a lumped element simulation of the transmission line.

In a Rayleigh network, the network includes a plurality of inductors of the same value mounted in series with each other. In between each pair of inductors, a capacitor connects the junction between the two inductors to ground. The capacitors are also all of the same value.

Although the Rayleigh network does approximate the transmission characteristics of a transmission line at high frequencies as the number of different segments, i.e. each inductor/capacitor pair, rises, it does so slowly. For example, an ideal transmission line has an infinite number of resonances. These resonances are identified as poles or zeros on an impedance versus frequency graph where the impedance goes to either zero or infinity to produce the infinity or zero, respectively.

In a lumped network, each additional LC (inductor/capacitor) segment has a resonance thus bringing the simulation of the transmission line closer to an ideal transmission line.

However, with a Rayleigh network, even the low frequency poles and zeros do not converge to the correct frequencies without a high number of LC segments. Indeed, in order to produce an acceptable transmission line power converter, 40 or more LC segments are required to simulate a transmission with acceptable accuracy. If a fewer number of LC segments are employed, the Rayleigh network exhibits poor conversions of the poles and zeros. This in turn generates unnecessary losses for the Rayleigh network. Furthermore, in the event that multiple converters are used with the same transmission line, a Rayleigh network with fewer than about 40 LC segments will exhibit cross talk between the converters.

The disadvantage of the Rayleigh network is that, because such a large number of discrete capacitors and inductors are required to simulate a transmission line with acceptable accuracy, the Rayleigh network requires a large amount of printed circuit footprint, cost in view of the large number of components, and increased labor cost for assembly.

SUMMARY OF THE PRESENT INVENTION

The present invention provides a DC-DC power converter which utilizes a transmission line as a storage device which overcomes the above mentioned disadvantages of the previously known Rayleigh networks.

In brief, like the previously known power converters, the power converter of the present invention includes a power source, a load, and a transmission line terminated at one end. The other end of the transmission line is selectively electrically connected to the power source by a first switch while a second switch selectively electrically connects the end of the transmission line with the load.

Unlike the previously known power converters, the present invention utilizes a pulse forming network to replace the Rayleigh network as the transmission line converter. Pulse forming networks are a family of circuits used in high frequency pulse generation to emulate transmission lines. Consequently, unlike a Rayleigh network, in a pulse forming network the poles and zeroes of the impedance network are designed to match the lowest resonances of the transmission line impedance function. The pulse forming network impedance is thus much closer to that of an ideal transmission line than a Rayleigh network with a fewer number of LC segments. For example, in practice, a pulse forming network having 5 LC segments is capable of more accurately simulating the electrical wave characteristics of a network than a Rayleigh network having 40 LC segments.

Although there are different types of pulse forming networks, the best known pulse forming network is the Guillemin network in which the inductor and capacitor values are derived from the Fourier transform of the transmission line impedance/admittance function. Other types of transforms, however, such as Laplace may also be used.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE INVENTION

Figure 1:
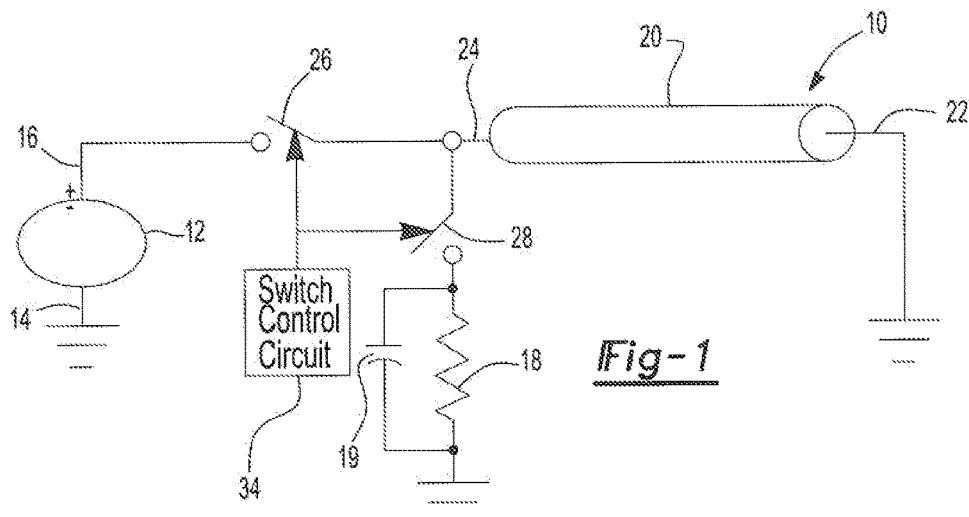
FIG. 1 is a diagrammatic view of a power converter according to the present invention.

With reference first to FIG. 1, a block diagram of a DC-DC power converter which utilizes a transmission line as the energy storage device is illustrated. The power converter 10 includes a DC power source 12 which may be of any conventional nature, such as a battery. One terminal 14 of the power supply 12 is grounded while a voltage is present on a second terminal 16 of the power supply 12.

The power inverter 10 also includes a resistive load 18 in parallel with a capacitor as well as a transmission line 20 which stores the energy or charge to boost the voltage level for the power supply 12 to a higher level for the load 18. The transmission line 20 is an impedance network that behaves like a transmission line and will be subsequently described in greater detail. However, one end 22 of the transmission line 20 is terminated, preferably in a ground. The other end 24 of the transmission line 20 is coupled to a first and a second switch 26 and 28 respectively. The first switch 26 is movable between an open and a closed position and, when closed, electrically connects the terminal 16 of the power supply 12 to the end 24 of the transmission line 20. Similarly, the second switch 28 is also movable between an open and a closed position. In its closed position, the second switch 28 electrically connects the end 24 of the transmission line 20 to the load 18.

Figure 2:
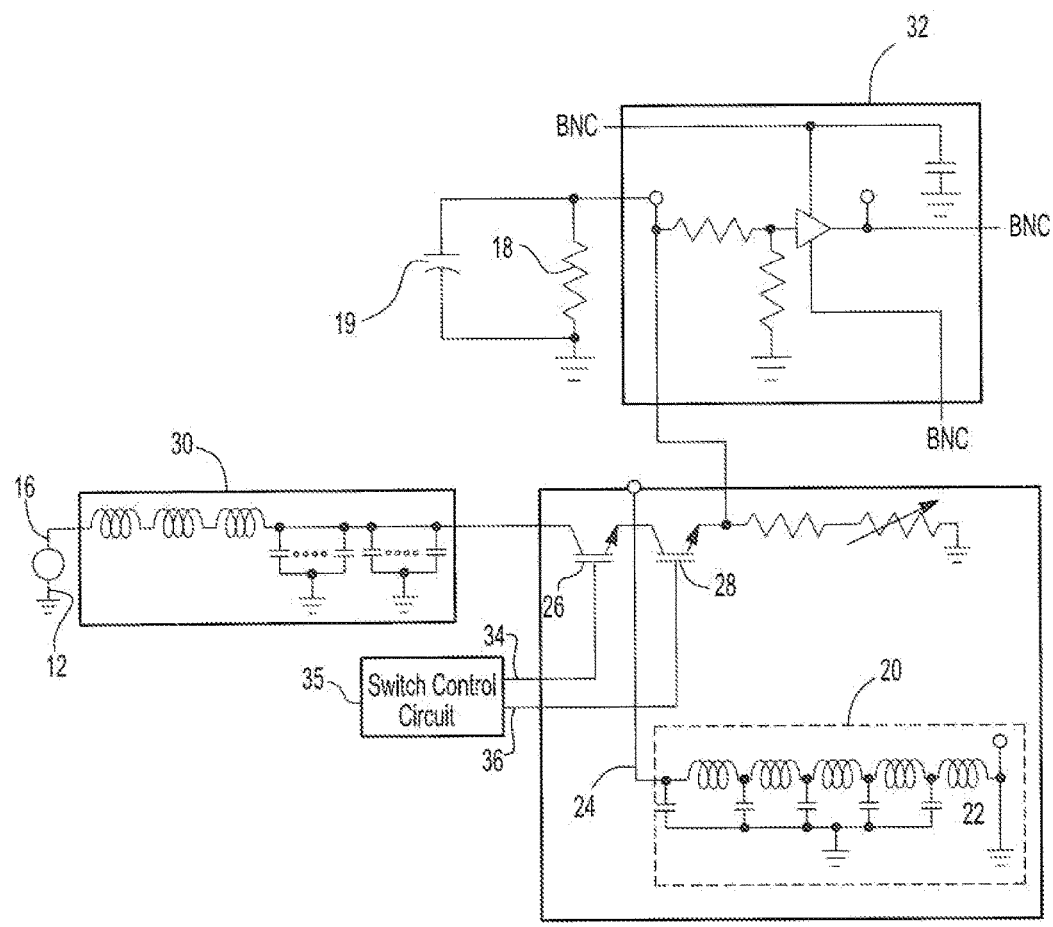
FIG. 2 is a schematic view of the power converter of the present invention.

With reference now to FIG. 2, a more detailed schematic view of the power inverter 10 is shown. In particular, two transistors form the input switches 26 and 28. Preferably, these transistors or switches 26 and 28 are field effect transistors for the high speed and high current switching capability of field effect transistors.

The terminal 16 of the power supply 12 is coupled to the transistor 26 through an input filter 30. The input filter may be of any conventional construction and eliminates, or at least reduces, spikes, ripples, and other signal impurities that may be present in the signal from the power supply 12.

A buffer 32 is also coupled to the resistive load 18. This buffer 32 provides a simple way to obtain access for measurement purposes of electrical properties, e.g. voltage, applied to the load 18.

A switch control circuit 34 is electrically connected to both transistor switches 26 and 28. As shown, the switch control circuit 34 includes two outlet lines, one connected to the gate of the transistor 26 and the other connected to the gate of the transistor 28. Consequently, by varying the signal between two voltage levels on the output lines 34 and 36, the switch control circuit toggles the transistor switches 26 and 28 between an open and a closed position.

With reference now particularly to FIG. 2, unlike the previously known power converters which utilized a transmission line as the energy storage device, the transmission line 20 of the present invention comprises a pulse forming network preferably having 5 LC segments. Unlike the Rayleigh networks where the inductors are all of the same value and, likewise, the capacitors are all of the same value, in the pulse forming network of the present invention, the values of the inductors and capacitors, illustrated in FIG. 2, are derived from a Fourier transform of the transmission line impedance/admittance functions. Other transforms, however, such as Laplace may alternatively be used.

In operation, the switch control circuit 34 operates the transistor switch 26 to charge the pulse forming network or transmission line 20 so that the wave in the transmission line 20 oscillates between the ends of the transmission line 20 due to impedance mismatch thus increasing the charge held by the transmission line 20. The switch control circuit then closes the transistor switch 28 thus discharging the stored energy from the transmission line 20 to the load 18. Since the energy or charge is stored in the transmission line 20 over a number of cycles of the wave propagating between the ends 22 and 24 of the transmission line 20, the voltage applied to the resistive load 18 upon closure of the transistor 28 is increased or boosted over the voltage of the power supply 12.

Figure 3:
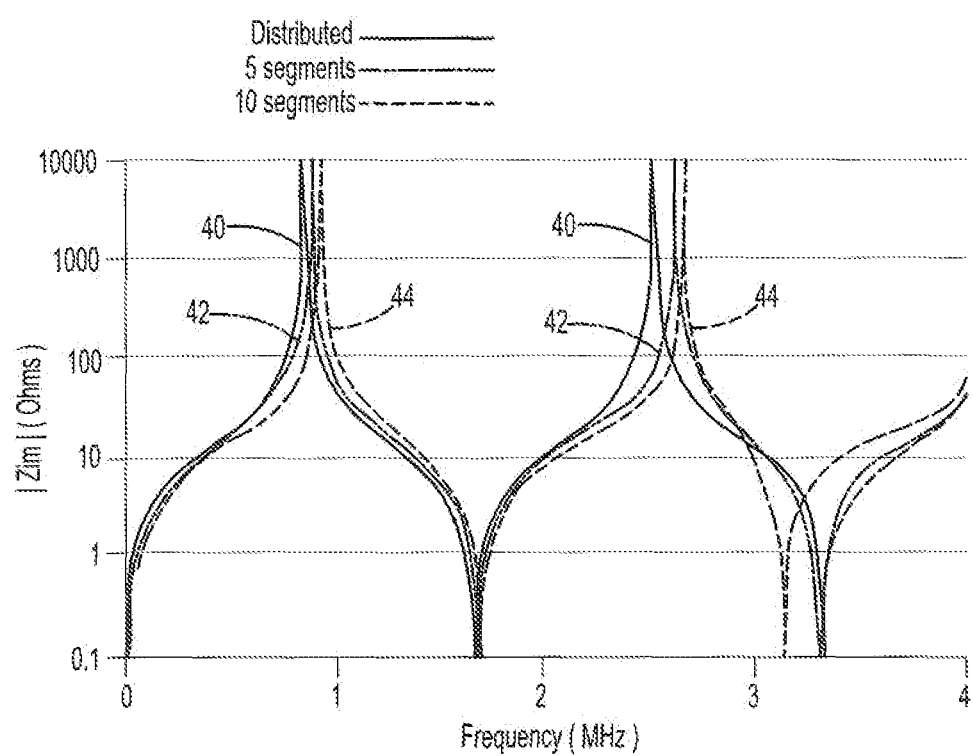
FIG. 3 is graphs illustrating the impedance of the transmission line versus frequency for different types of transmission lines.

With reference now to FIG. 3, graph 40 illustrates the impedance on the Y axis as a function of frequency on the X axis for a distributed transmission line 20. A distributed transmission line 20, of course, forms the ideal transmission line.

Graph 42 illustrates the characteristics of the transmission line as implemented by the pulse forming network of the present invention as a function of frequency. As can be seen, graph 40 and 42 are nearly identical to each other thus confirming that a 5 LC segment pulse forming network more closely approximates the impedance versus frequency characteristics of a distributed transmission line than a previously known Rayleigh network constructed with 10 elements as illustrated by graph 44.

From the foregoing, it can be seen that the present invention provides an improved DC-DC power converter with improved performance at a lower component expenditure than the previously known power converters. Having described my invention, however, many modifications thereto will become apparent to those skilled in the art to which it pertains without deviation from the spirit of the invention as defined by the scope of the appended claims.

We claim:
1. A DC-DC power converter comprising:
a power source,
a load,
a capacitor connected in parallel with said load,
a transmission line terminated at one end,
a first switch electrically connected between said power source and a second end of said transmission line and movable between an open and a closed position,
a second switch electrically connected between said second end of said transmission line and said load and movable between an open and a closed position,
a switch control circuit for switching said first and second switches between said open and said closed position at a sufficiently high frequency so that a wave is propagated through said transmission line,
wherein said transmission line comprises a Guillemin network having a plurality of inductors connected in series and a capacitor electrically connected between each pair of inductors and said one end of said transmission line and ground,
wherein said first and second switches together comprise a single pole, double throw switch,
wherein said first switch comprises a transistor and said second switch comprises a transistor, wherein said switch control circuit comprises a function generator having an output connected as an input signal to said first transistor and an inverse output connected as an input signal to said second transistor, wherein said first and second transistors are field effect transistors, wherein said one end of said transmission line is terminated at ground.

2. The DC-DC power converter as defined in claim 1 wherein the values of said inductors and said capacitors are selected so that the transmission line approximates a distributed load.

* * * * *